(12) United States Patent
Xie

(10) Patent No.: US 9,908,784 B2
(45) Date of Patent: Mar. 6, 2018

(54) SYNTHESIS OF MOLECULAR SIEVE SSZ-99

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 15/416,028

(22) Filed: Jan. 26, 2017

(65) Prior Publication Data

US 2017/0297918 A1  Oct. 19, 2017

Related U.S. Application Data

(60) Provisional application No. 62/322,269, filed on Apr. 14, 2016.

(51) Int. Cl.
  *C01B 39/48* (2006.01)
  *B01J 29/70* (2006.01)
  *B01J 20/18* (2006.01)

(52) U.S. Cl.
  CPC .............. *C01B 39/48* (2013.01); *B01J 20/18* (2013.01); *B01J 29/70* (2013.01); *C01P 2002/72* (2013.01)

(58) Field of Classification Search
  CPC ............ C01B 39/48; B01J 29/70; B01J 20/18
  See application file for complete search history.

(56) References Cited

U.S. PATENT DOCUMENTS

| | | |
|---|---|---|
| 9,192,924 B1 | 11/2015 | Zones et al. |
| 9,193,600 B1 | 11/2015 | Zones et al. |
| 9,475,038 B2 | 10/2016 | Zones et al. |
| 9,550,684 B2 * | 1/2017 | Weston .................. C10G 50/00 |
| 2017/0297918 A1* | 10/2017 | Xie .......................... C01B 39/48 |

* cited by examiner

*Primary Examiner* — David M Brunsman
(74) *Attorney, Agent, or Firm* — Terrence M. Flaherty

(57) ABSTRACT

A molecular sieve having the structure of SSZ-99 is synthesized using 1,1-diethylpyrrolidinium cations as a structure directing agent.

7 Claims, 2 Drawing Sheets

SYNTHESIS OF MOLECULAR SIEVE SSZ-99

TECHNICAL FIELD

The present disclosure is directed to a method of synthesizing molecular sieve SSZ-99 using 1,1-diethylpyrrolidinium cations as a structure directing agent.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Molecular sieves such as zeolites have been used extensively to catalyze a number of chemical reactions in refinery and petrochemical reactions, and catalysis, adsorption, separation, and chromatography.

U.S. Pat. Nos. 9,192,924 and 9,193,600 disclose molecular sieve SSZ-99 and its synthesis using methylethyldiisopropylammonium cations as a structure directing agent.

According to the present disclosure, molecular sieve SSZ-99 has now been synthesized using 1,1-diethylpyrrolidinium cations as a structure directing agent.

SUMMARY

In one aspect, there is provided a method of synthesizing a molecular sieve having the structure of SSZ-99, the method comprising: (a) preparing a reaction mixture comprising: (1) a source of silicon oxide; (2) a source of aluminum oxide; (3) a source of Group 1 or 2 metal; (4) a structure directing agent comprising 1,1-diethylpyrrolidinium cations; (5) hydroxide ions; and (6) water; and (b) subjecting the reaction mixture to crystallization condition sufficient to form crystals of the molecular sieve.

In another aspect, there is provided a molecular sieve having the structure of SSZ-99 and comprising 1,1-diethylpyrrolidinium cations in its pores.

In its as-synthesized and anhydrous form, the present molecular sieve has a chemical composition comprising the following molar relationship:

|  | Embodiment 1 | Embodiment 2 |
| --- | --- | --- |
| $SiO_2/Al_2O_3$ | 5 to 50 | 5 to 15 |
| $Q/SiO_2$ | >0 to 0.2 | >0 to 0.1 |
| $M/SiO_2$ | >0 to 0.2 | >0 to 0.1 | wherein Q comprises 1,1-diethylpyrrolidinium cations and M is a Group 1 or 2 metal.

DETAILED DESCRIPTION

Introduction

Figure 1:
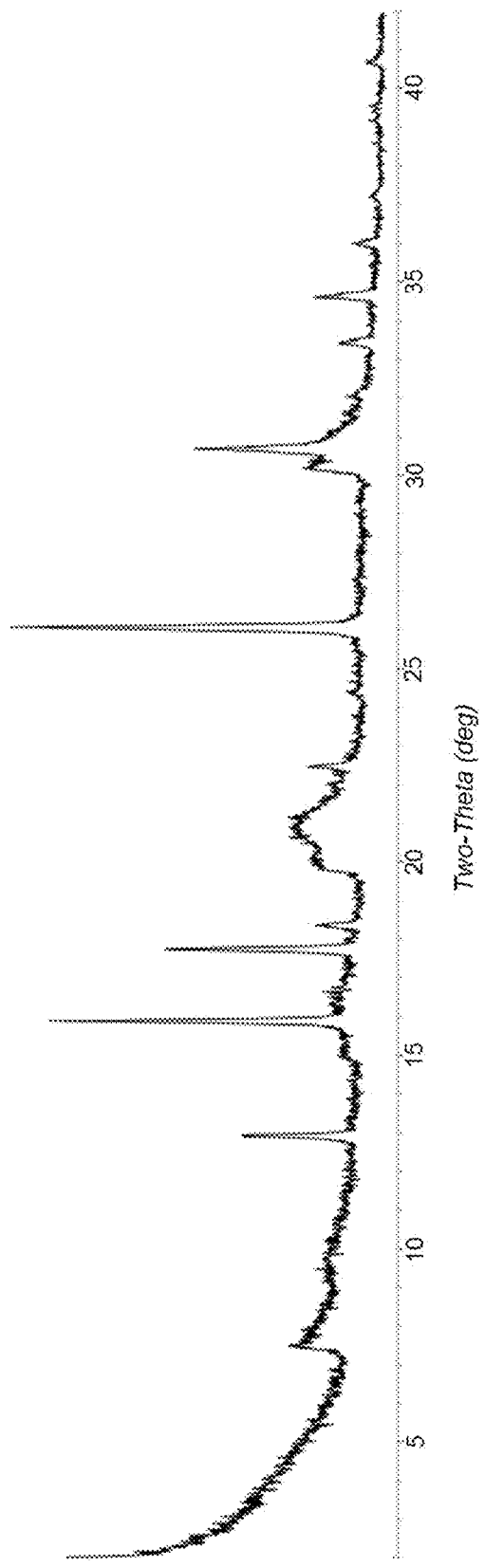
FIG. 1 is a powder X-ray diffraction (XRD) pattern of the as-synthesized zeolite prepared in Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, the molecular sieve is synthesized by: (a) preparing a reaction mixture comprising (1) a source of silicon oxide; (2) a source of aluminum oxide; (3) a source of a Group 1 or 2 metal (M); (4) a structure directing agent (Q) comprising 1,1-diethypyrrolidinium cations; (5) hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Useful | Exemplary |
| --- | --- | --- |
| $SiO_2/Al_2O_3$ | 5 to 50 | 10 to 30 |
| $M/SiO_2$ | 0.10 to 1.0 | 0.50 to 0.80 |
| $Q/SiO_2$ | 0.05 to 0.50 | 0.10 to 0.30 |
| $OH/SiO_2$ | 0.10 to 1.0 | 0.25 to 0.45 |
| $H_2O/SiO_2$ | 15 to 60 | 20 to 50 | wherein Q and M are as described herein above.

Suitable sources of silicon oxide include colloidal silica, fumed silica, precipitated silica, alkali metal silicates, and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y).

Suitable sources of Group 1 or 2 metal (M) include metal oxide, metal hydroxide, metal chloride, metal fluoride, metal sulfate, metal nitrate, and metal aluminate. Examples of suitable Group 1 or Group 2 metals (M) include sodium, potassium and calcium, with sodium being preferred.

The structure directing agent (Q) comprises 1,1-diethylpyrrolidinium cations, represented by the following structure (1):

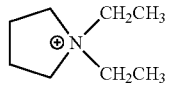

(1)

Suitable sources of Q are the hydroxides, chlorides, bromides, and/or other salts of the quaternary ammonium compound.

The reaction mixture may also contain seeds of a molecular sieve material, such as SSZ-99, from a previous synthesis, desirably in an amount of from 0.01 to 10,000 ppm by weight (e.g., from 100 to 5000 ppm by weight) of the reaction mixture.

For each embodiment described herein, the reaction mixture can be supplied by more than one source. Also, two or more reaction components can be provided by one source.

The reaction mixture can be prepared either batch wise or continuously. Crystal size, morphology and crystallization time of the crystalline molecular sieve described herein can vary with the nature of the reaction mixture and the crystallization conditions.

Crystallization and Post-Synthesis Treatment

Crystallization of the molecular sieve can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 1 day to 21 days. Crystallization is usually carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

The as-synthesized molecular sieve may be subjected to treatment to remove part or all of the organic structure directing agent (Q) used in its synthesis. This is conveniently effected by thermal treatment in which the as-synthesized material is heated at a temperature of at least about 370° C. for at least 1 minute and generally not longer than 20 hours. The thermal treatment can be performed at a temperature up to about 925° C. While sub-atmospheric pressure can be employed for the thermal treatment, atmospheric pressure is desired for reasons of convenience. Additionally or alternatively, the organic structure directing agent can be removed by treatment with ozone (see, e.g., A. N. Parikh et al., *Micropor. Mesopor. Mater.* 2004, 76, 17-22).

Any extra-framework Group 1 or 2 metal cations in the molecular sieve can be replaced in accordance with techniques well known in the art by ion exchange with other cations. Preferred replacing cations include metal ions (e.g., rare earth metals, metals of Groups 2 to 15 of the Periodic Table of Elements), hydrogen ions, hydrogen precursor ions (e.g., ammonium ions), and mixtures thereof.

Characterization of the Molecular Sieve

In its as-synthesized and anhydrous form, the molecular sieve prepared by the present method has a chemical composition comprising the following molar relationship:

|  | Broad | Exemplary |
|---|---|---|
| $SiO_2/Al_2O_3$ | 5 to 50 | 5 to 15 |
| $Q/SiO_2$ | >0 to 0.2 | >0 to 0.1 |
| $M/SiO_2$ | >0 to 0.2 | >0 to 0.1 | wherein Q comprises 1,1-diethylpyrrolidinium cations and M is a Group 1 or 2 metal.

It should be noted that the as-synthesized form of the molecular sieve described herein may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined from, molecular sieve prepared by the present method has a chemical composition comprising the following molar relationship:

$Al_2O_3:(n)SiO_2$ wherein n has a value of from 5 to 50 (e.g., 5 to 45, 5 to 40, 5 to 35, 5 to 30, 5 to 25, 5 to 20, 5 to 15, or 5 to 10).

As disclosed in U.S. Pat. No. 9,192,924, molecular sieve SSZ-99 is characterized by an X-ray diffraction pattern which, in the as-synthesized form of the molecular sieve, includes at least the peaks set forth in Table 2 and which, in the calcined form of the molecular sieve includes at least the peaks set forth in Table 3.

TABLE 2

Characteristic Peaks for As-Synthesized SSZ-99

| 2-Theta[a] | d-Spacing, nm | Relative Intensity[b] | Peak Broadening[c] | P/N[d] |
|---|---|---|---|---|
| 7.54 | 1.172 | M | B | L |
| 9.71 | 0.910 | W | VB | L |
| 12.94 | 0.684 | W | Sh | H |
| 14.97 | 0.591 | M | Sh | L |
| 15.92 | 0.556 | S | Sh | H |
| 17.78 | 0.499 | M | Sh | H |
| 18.40 | 0.482 | W | Sh | L |
| 19.86 | 0.447 | M | B | L |
| 21.26 | 0.418 | S | VB | L |
| 22.51 | 0.395 | W | B | L |
| 24.40 | 0.365 | W | Sh | L |
| 26.10 | 0.341 | VS | Sh | H |
| 27.35 | 0.326 | W | B | L |
| 28.17 | 0.317 | W | B | L |

[a] ±0.20
[b] The powder X-ray diffraction patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).
[c] Peak broadening is characterized by the Full-Width at Half Maximum (FWHM) of the XRD peak. Based on the FWHM values, the peaks are classified as: Sh = sharp (≤2*smallest FWHM); B = broad (>2*smallest FWHM to ≤5*smallest FWHM); VB = very broad (>5*smallest FWHM).
[d] P/N is the peak to noise ratio which is calculated as P/N = (Peak Height − Background)/√Peak Height. L = low (≤15); H = high (>15).

TABLE 3

Characteristic Peaks for Calcined SSZ-99

| 2-Theta[a] | d-Spacing, nm | Relative Intensity[b] | Peak Broadening[c] | P/N[d] |
|---|---|---|---|---|
| 7.47 | 1.183 | M | B | L |
| 9.75 | 0.907 | W | VB | L |
| 12.93 | 0.684 | M | Sh | H |
| 15.06 | 0.588 | W | Sh | L |
| 15.90 | 0.557 | VS | Sh | L |
| 17.82 | 0.497 | M | Sh | H |
| 18.39 | 0.482 | W | Sh | L |
| 19.86 | 0.447 | M | B | L |
| 21.38 | 0.415 | S | VB | L |
| 24.44 | 0.364 | W | Sh | L |
| 26.12 | 0.341 | VS | Sh | H |
| 27.17 | 0.328 | W | B | L |
| 28.22 | 0.316 | W | B | L |

[a] ±0.20
[b] The powder-ray diffraction patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).
[c] Peak broadening is characterized by the Full-Width at Half Maximum (FWHM) of the XRD peak. Based on the FWHM values, the peaks are classified as: Sh = sharp (≤2*smallest FWHM); B = broad (>2*smallest FWHM to ≤5*smallest FWHM); VB = very broad (>5*smallest FWHM).
[d] P/N is the peak to noise ratio which is calculated as P/N = (Peak Height − Background)/√Peak Height. L = low (≤15); H = high (>15).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks, and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern.

EXAMPLES

The following illustrative examples are intended to be non-limiting.

Example 1

Synthesis of SSZ-99

4.51 g of 50% NaOH solution, 42.31 g of deionized water and 7.00 g of CBV 720 Y-zeolite (Zeolyst International, $SiO_2/Al_2O_3$ molar ratio=30) powder were mixed together in a Teflon liner. Then, a 20% 1,1-diethylpyrrolidinium hydroxide solution (20.47 g) was added to the mixture. The resulting gel was stirred until it became homogeneous. The liner was then capped and placed within a Parr Steel autoclave reactor. The autoclave was then put in an oven heated at 135° C. for 3 days. The solid products were recovered from the cooled reactor by centrifugation, washed with deionized water and dried at 95° C.

Figure 2:
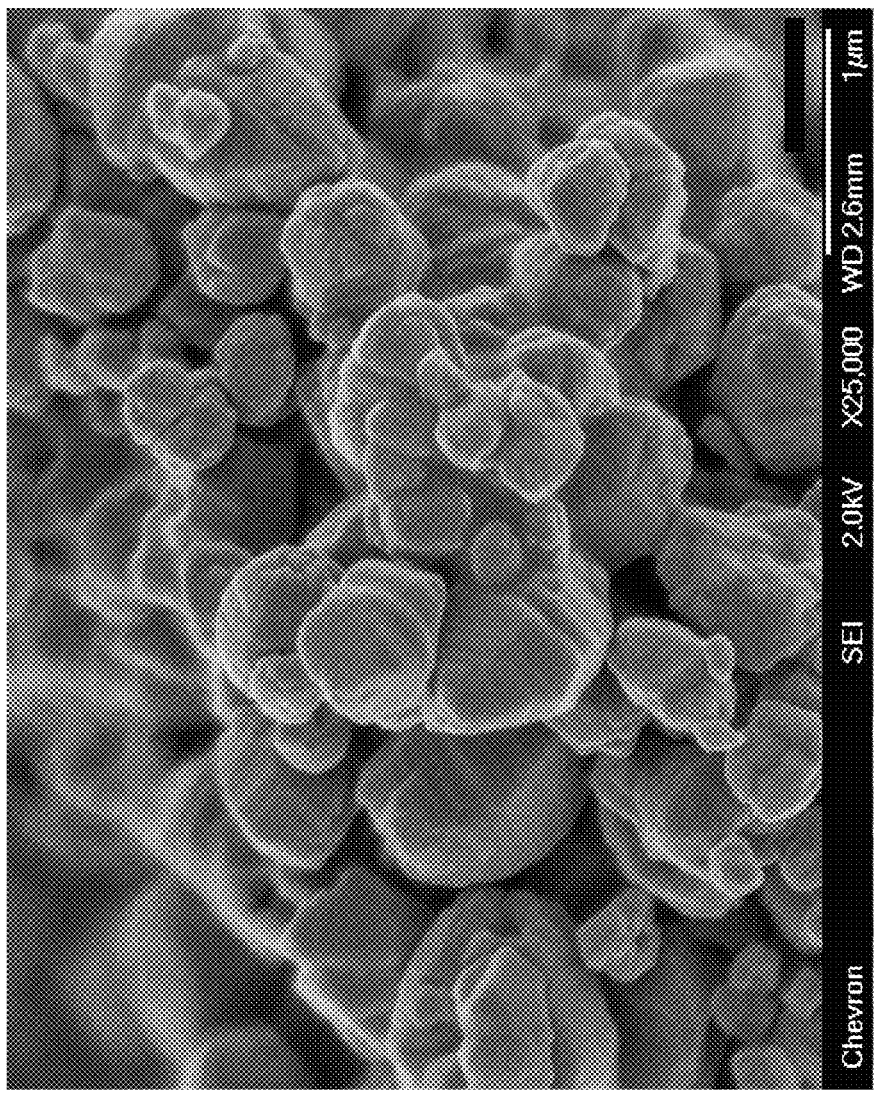
FIG. 2 is a Scanning Electron Micrograph (SEM) image of the as-synthesized zeolite prepared in Example 1.

The resulting product was analyzed by powder XRD and SEM. The powder X-ray diffraction pattern in FIG. 1 is consistent with the product being molecular sieve SSZ-99. The SEM image is shown in FIG. 2 and indicates a uniform field of crystals.

The product had a $SiO_2/Al_2O_3$ molar ratio of 7.7, as determined by ICP elemental analysis.

Example 2

Synthesis of SSZ-99

1.29 g of 50% NaOH solution, 22.10 g of deionized water and 2.00 g of CBV 720 Y-zeolite (Zeolyst International, $SiO_2/Al_2O_3$ molar ratio=30) powder were mixed together in a Teflon liner. Then, a 20% 1,1-diethylpyrrolidinium hydroxide solution (8.19 g) was added to the mixture. The resulting gel was stirred until it became homogeneous. The liner was then capped and placed within a Parr Steel autoclave reactor. The autoclave was then put in an oven heated at 150° C. for 4 days. The solid products were recovered from the cooled reactor by centrifugation, washed with deionized water and dried at 95° C.

The resulting product was identified by powder XRD and SEM to be molecular sieve SSZ-99.

The product had a $SiO_2/Al_2O_3$ mole ratio of 8.9, as determined by ICP elemental analysis.

Example 3

Calcination of SSZ-99

The as-synthesized product of Example 1 was calcined inside a muffle furnace under a flow of air heated to 540° C. at a rate of 1° C./minute and held at 540° C. for 5 hours, cooled and then analyzed by powder XRD. The powder XRD pattern indicated that the material remained stable after calcination to remove the organic SDA.

Example 4

Ammonium-Ion Exchange of SSZ-99

The calcined material from Example 3 (Na-SSZ-99) was treated with 10 mL (per g of molecular sieve) of a 1N ammonium nitrate solution at 90° C. for 2 hours. The solution was cooled, decanted off and the same process repeated.

The resulting product ($NH_4$-SSZ-99) after drying was subjected to a micropore volume analysis using $N_2$ as adsorbate and via the B.E.T. method. The molecular sieve exhibited a micropore volume of 0.19 $cm^3/g$.

The invention claimed is:

1. A method of synthesizing a molecular sieve having the structure of SSZ-99, the method comprising:
   (a) preparing a reaction mixture comprising:
      (1) a source of silicon oxide;
      (2) a source of aluminum oxide;
      (3) a source of Group 1 or 2 metal (M);
      (4) a structure directing agent (Q) comprising 1,1-diethylpyrrolidinium cations;
      (5) hydroxide ions;
      (6) water; and
   (b) subjecting the reaction mixture to crystallization condition sufficient to form crystals of the molecular sieve.

2. The method of claim 1, wherein the reaction mixture has a composition, in terms of molar ratios, as follows:

| | |
|---|---|
| $SiO_2/Al_2O_3$ | 5 to 50 |
| $M/SiO_2$ | 0.10 to 1.0 |
| $Q/SiO_2$ | 0.05 to 0.50 |
| $OH/SiO_2$ | 0.10 to 1.0 |
| $H_2O/SiO_2$ | 15 to 60. |

3. The method of claim 1, wherein the reaction mixture has a composition, in terms of mole ratios, as follows:

| | |
|---|---|
| $SiO_2/Al_2O_3$ | 10 to 30 |
| $M/SiO_2$ | 0.50 to 0.80 |
| $Q/SiO_2$ | 0.10 to 0.30 |
| $OH/SiO_2$ | 0.25 to 0.45 |
| $H_2O/SiO_2$ | 20 to 50. |

4. The method of claim 1, wherein the crystallization conditions include a temperature of from 125° C. to 200° C.

5. An molecular sieve having the structure of SSZ-99 and comprising 1,1-diethylpyrrolidinium cations in its pores.

6. The molecular sieve of claim 5, having a composition, in its as-synthesized and anhydrous form, comprising the following molar relationship:

| | |
|---|---|
| $SiO_2/Al_2O_3$ | 5 to 50 |
| $M/SiO_2$ | >0 to 0.2 |
| $Q/SiO_2$ | >0 to 0.2 | wherein Q comprises 1,1-diethylpyrrolidinium cations and M is Group 1 or 2 metal.

7. The molecular sieve of claim 5, having a composition, in its as-synthesized and anhydrous form, comprising the following molar relationship:

| | |
|---|---|
| SiO$_2$/Al$_2$O$_3$ | 5 to 15 |
| M/SiO$_2$ | >0 to 0.1 |
| Q/SiO$_2$ | >0 to 0.1 | wherein Q comprises 1,1-diethylpyrrolidinium cations and M is Group 1 or 2 metal.

\* \* \* \* \*